July 2, 1940.  L. G. HUNTER  2,206,725
VEHICLE INDICATOR
Filed May 19, 1939  3 Sheets-Sheet 1
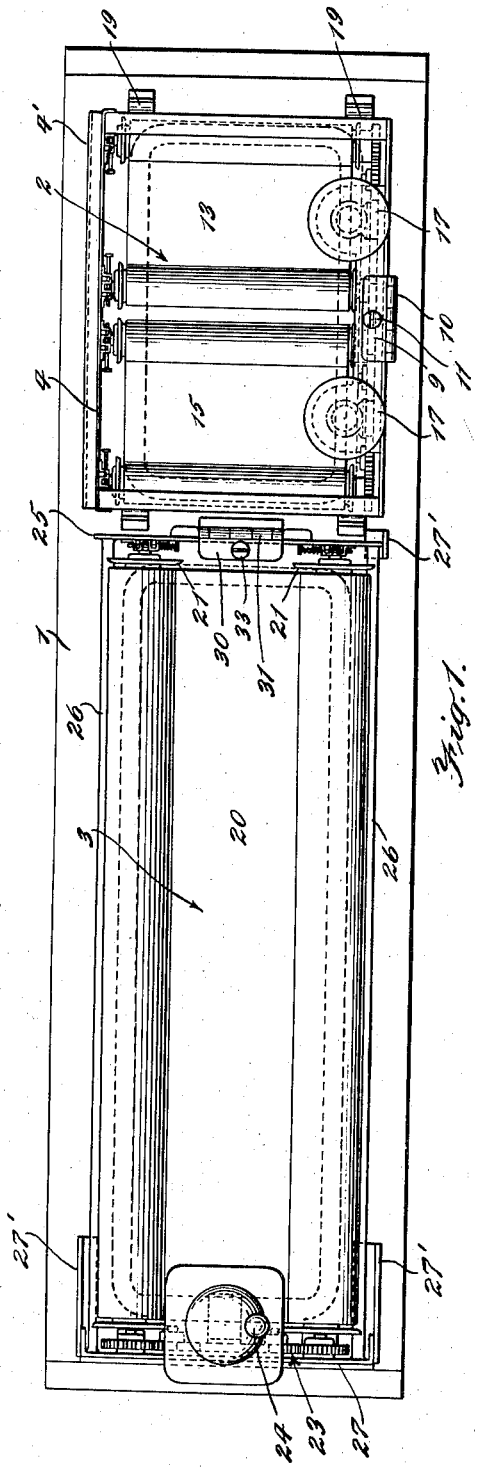
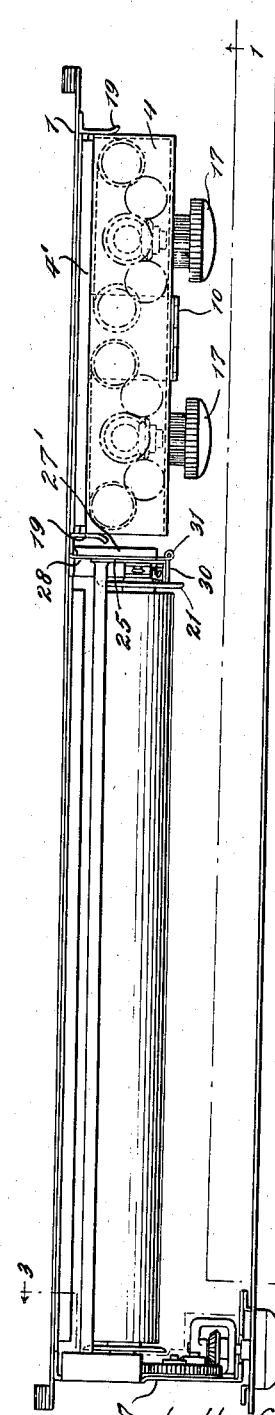
INVENTOR.
Lytle Gale Hunter
BY
Gifford, Scull & Burgess
ATTORNEYS July 2, 1940.　　　L. G. HUNTER　　　2,206,725
VEHICLE INDICATOR
Filed May 19, 1939　　　3 Sheets-Sheet 2
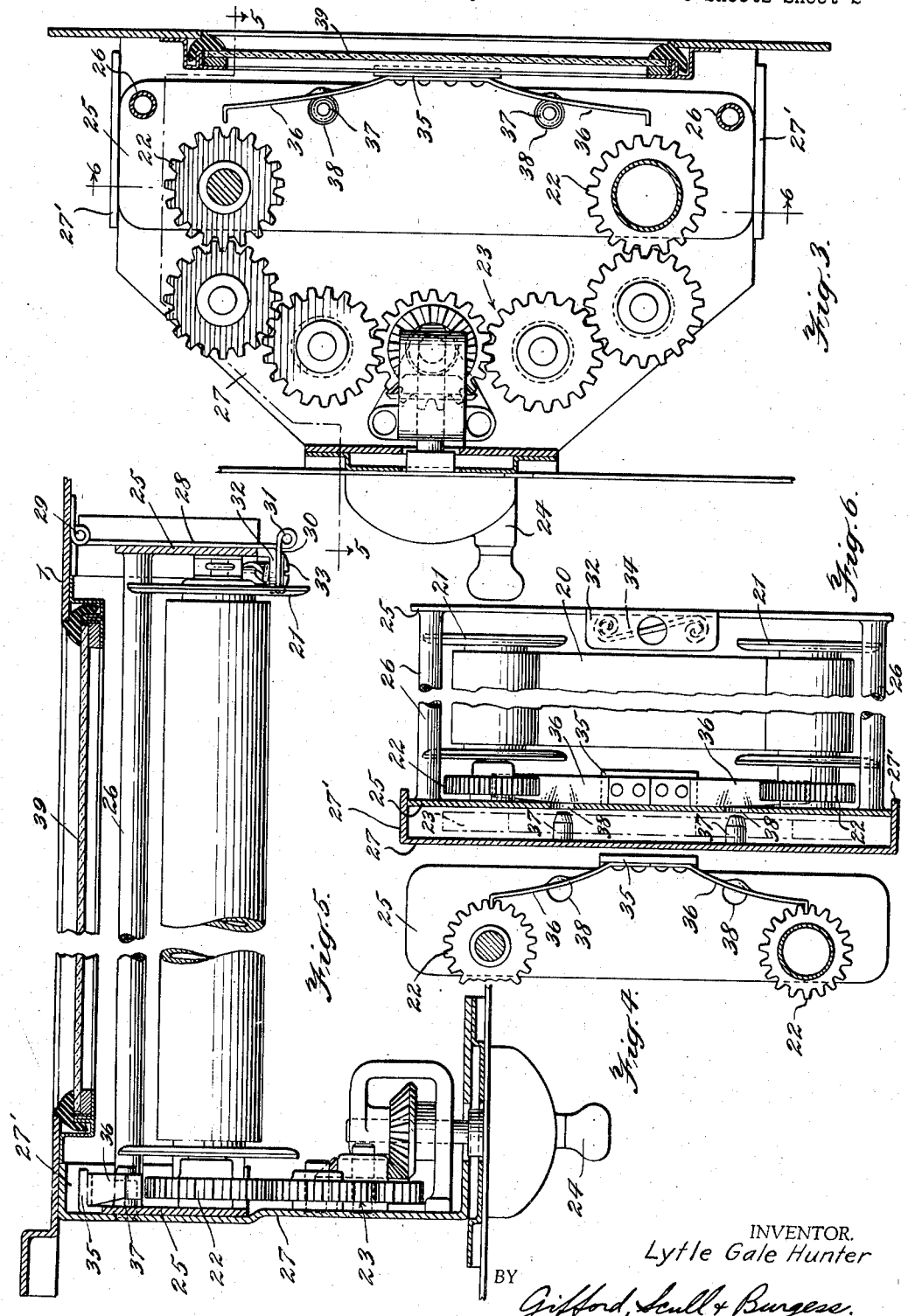
INVENTOR.
Lytle Gale Hunter
BY
Gifford, Scull & Burgess.
ATTORNEYS July 2, 1940.  L. G. HUNTER  2,206,725
VEHICLE INDICATOR
Filed May 19, 1939   3 Sheets-Sheet 3
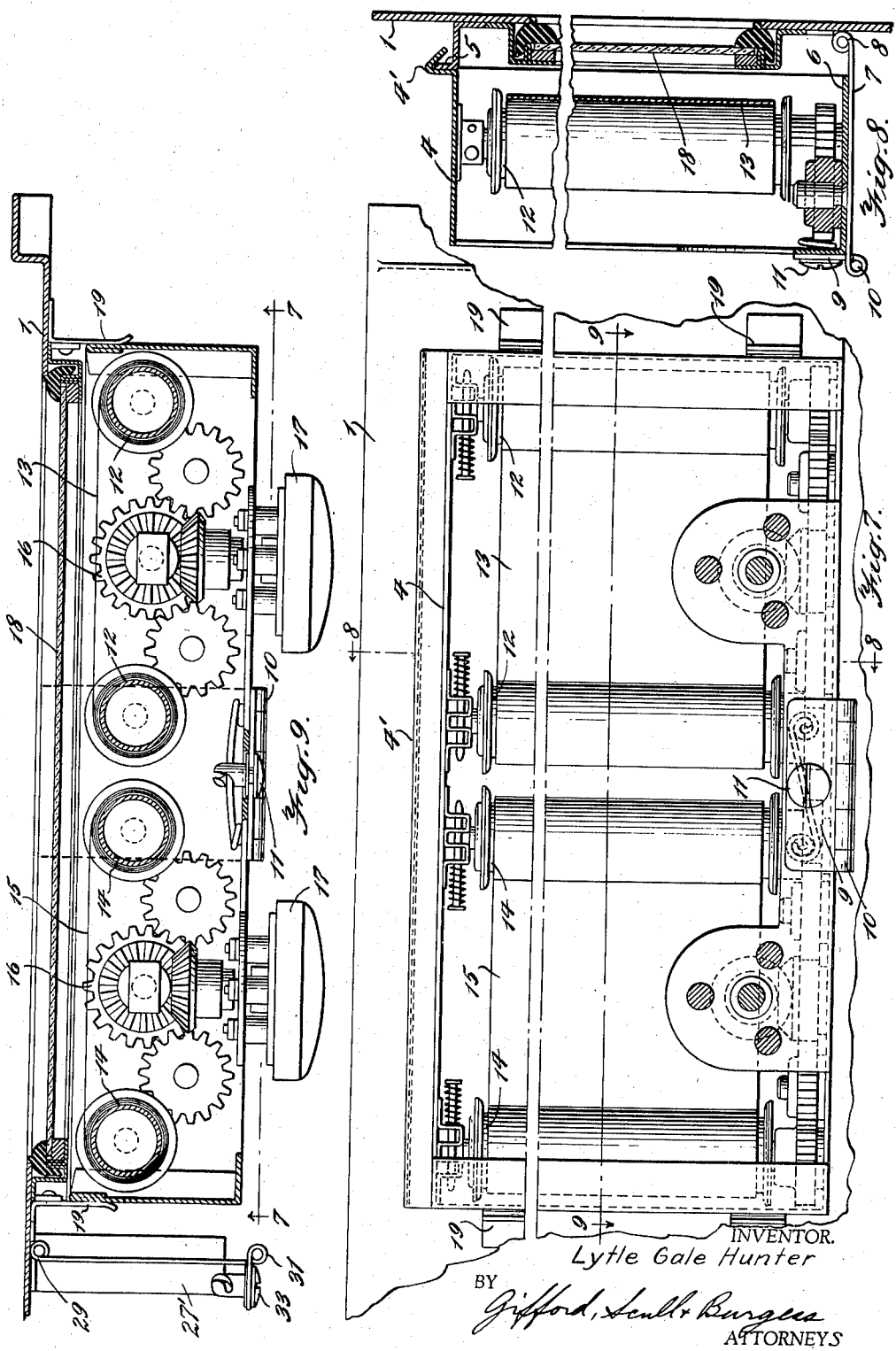
INVENTOR.
Lytle Gale Hunter
BY
Gifford, Scull & Burgess
ATTORNEYS Patented July 2, 1940

2,206,725

UNITED STATES PATENT OFFICE 2,206,725

VEHICLE INDICATOR

Lytle Gale Hunter, Flushing, N. Y., assignor to The Hunter Illuminated Car Sign Co. Inc., Flushing, N. Y., a corporation of New York Application May 19, 1939, Serial No. 274,575

5 Claims. (Cl. 40—95)

This invention relates to a novel and improved form of vehicle indicator, the novel features of which will be best understood from the following description and the annexed drawings, in which I have shown a selected embodiment of the invention and in which:

Fig. 1 is a rear view of the illustrated embodiment of the indicator, taken approximately on the line 1—1 of Fig. 2, with parts being omitted;

Fig. 2 is a top view of the structure appearing in Fig. 1;

Fig. 3 is a view on an enlarged scale taken approximately on the line 3—3 of Fig. 2, but with the sign web omitted;

Fig. 4 is a view of part of the apparatus shown in Fig. 3, but in different position;

Fig. 5 is a view approximately on the line 5—5 of Fig. 3, but showing one of the web rollers in position;

Fig. 6 is a view approximately on the line 6—6 of Fig. 3, but showing a sub-frame in partly removed position;

Fig. 7 is a view on an enlarged scale taken on a plane parallel to the plane of Fig. 1 and showing the structure at the right-hand end of that figure, this plane being indicated approximately by the line 7—7 of Fig. 9;

Fig. 8 is a view taken approximately on the line 8—8 of Fig. 7;

Fig. 9 is a view taken approximately on the line 9—9 of Fig. 7.

Referring first to Figs. 1 and 2, I have shown therein a frame 1 which may be any suitable part of the frame of a vehicle and which supports a route sign 2 and a destination sign 3. These signs are changeable and are shown in the form of webs, as is common in the art.

In any place, for example a large city, where it is desirable to use a vehicle, such as a bus, on different routes, a problem arises in regard to providing a sufficient number of signs so that the vehicle may be used on any route. Usually a web may be conveniently made of sufficient length to contain all of the route designations without that length becoming prohibitive. However, or any route on which the vehicle travels, there may be, and usually are, several destinations. This means that the length of a web carrying destination signs would have to be impracticably long in order to show all the destinations for use on all routes on which the vehicle is to be used. This problem I have solved by the arrangement which will now be described.

Mounted on the frame 1 is a sign box having a wall 4 which, as best shown in Figs. 7, 8, and 9, is provided with a flange 4' which may lock with a flange 5 on the frame 1. The wall 6 of the box opposite the flange 4' engages a fastener 7 which may be hinged to the frame as at 8 so that, after the flanges 4' and 5 have been brought into engagement, the fastener may be brought into contact with the wall 6, as best shown in Fig. 8, and then the box may be clamped in position by engaging the top thereof with an ear 9 hinged at 10 to the top of the fastener 7. This ear is then clamped to the top of the box by a suitable clamping device 11.

In the box are mounted rollers, here shown as four in number, one pair of rollers which are designated 12 having a web 13 thereon and the other pair of rollers which are designated 14 having a second web 15 mounted thereon. Suitable gear trains, indicated generally at 16 and operable by handles 17, may rotate the rollers in a manner known in the art to cause the webs to pass a window 18. It will be understood that the webs 13 and 15 are changeable signs which may be used to carry any desired route designations thereon. For example, the web 13 may carry different letters of the alphabet, whereas the web 15 may carry various numbers, all depending upon the system used in the particular place where the vehicle is employed. If the number of routes is more than can be conveniently placed upon practicable lengths of webs, then the entire box may be removed and another box put into its place, this other box carrying webs with different route designations thereon. Ordinarily, however, the two webs will be sufficient to carry all necessary route designations.

The box may be held in correct position lengthwise of the frame by suitable guides 19 which are mounted on the frame 1 and are flared outwardly at their ends, as best shown in Fig. 9.

The changeable destination sign is in the form of a web 20 supported on rollers 21, on the spindles of which are gears 22 meshing with other gears of a gear train, best shown in Fig. 3 and which is indicated generally by the numeral 23. This train may be operated by a handle 24 so as to turn the gears 22 in opposite directions and thus wind the web 20 in opposite directions. Normally one of the gears 22 will be connected to the spindle of its roller by a spring so as to maintain the web 20 under the spring tension. Such an arrangement is well known in the art and, since its details are not necessary to an understanding of this invention, those details will not be described.

The gears 22 are mounted in a sub-frame which may take any suitable form, but which is here shown as two parallel plates 25 fastened together by tubes 26, and this sub-frame may be held in position on the frame 1 between a bracket 27 extending rearwardly from the frame and a fastener 28 hinged to the frame at 29 and having an ear 30 hinged thereto at 31. Flanges 27' hold the sub-frame against vertical movement. The ear 30 may be folded over a flange 32 on one of the plates 25 and one element 33 on the ear may engage another element 34 on the flange to hold the sub-frame in position. The details of the clamping device are not necessary for an understanding of this invention and therefore they will not be described.

The gears 22 will be disposed adjacent one of the plates 25, as shown in Fig. 6, and this plate has an inwardly extending flange 35 upon which are mounted two spring arms 36, the resiliency of which tends to hold the ends thereof in engagement with the gears 22, as shown in Fig. 4. Accordingly, when the sub-frame is disconnected from the frame, these gears 22 will be held against rotation by the arms, and the web supported by the rollers to which these two gears are attached will be held under the same tension as when the gears 22 are in engagement with the gear train 23.

On the bracket 27 are shown two inwardly extending cam and centering pins 37 which are so arranged as to pass through two holes 38 in one of the plates 25 and at the same time to move the spring arms 36 out of engagement with the gears 22, as shown in Fig. 3.

In Fig. 6 I have shown the sub-frame as in a position where it has just been moved out of engagement with the pins 37 or is about to be engaged thereby. The arrangement is such that, when the sub-frame is being put in operative position on the frame 1, the spring arms 36 will hold the gears 22 against rotation until these gears engage the gear train 23 and then the pins 37 will unlock the gears 22 by engaging the spring arms 36.

By the above arrangement it is possible to use a vehicle on any number of routes, and any route or a group of routes may have a changeable destination sign mounted on a sub-frame so that it may be readily changed. For example, in a large city it is sometimes the practice to send busses from one section of the city to another to take care of varying traffic loads and usually each section of the city has a central headquarters. By my invention it is possible for each of these headquarters to have on hand a set of changeable destination signs in the form of webs, with each web mounted on rollers in a sub-frame and always held under tension. Then before the bus is sent to another headquarters, the destination sign may be removed and when it arrives at the other headquarters a new destination sign may easily be put in place. In any case the changeable destination sign is displayed through a suitable window 39 and may be readily removed and replaced by another. At the same time the destination signs may be removed and replaced if necessary, although oftentimes such necessity will not arise.

While I have shown the invention as embodied in a specific form, it is to be understood that various changes in details may be made without departing from the scope of the invention as defined by the appended claims.

I claim:

1. In a vehicle indicator, a frame, a changeable sign, mechanism in fixed position on the frame and adapted to change said sign, means removably holding said sign in operative engagement with said mechanism, and means preventing changing of said sign when removed from said operative engagement.

2. In a vehicle indicator, a pair of rollers having a web sign wound thereon, a gear on one end of each roller, a frame supporting a gear train adapted to engage the gears on the rollers to wind and unwind the web, a sub-frame supporting said rollers, and means removably holding the sub-frame on the frame with the gears on the rollers in operative engagement with the gear train.

3. In a vehicle indicator, a pair of rollers having a web sign wound thereon, a gear on one end of each roller, a frame supporting a gear train adapted to engage the gears on the rollers to wind and unwind the web, a sub-frame supporting said rollers, means removably holding the sub-frame on the frame with the gears on the rollers in operative engagement with the gear train, a lock holding said rollers against rotation when the gears thereon are out of engagement with the gear train, and means releasing said lock when said gears are in said engagement.

4. In a vehicle indicator, a pair of rollers having a web sign wound thereon, a gear on one end of each roller, a frame supporting a gear train adapted to engage the gears on the rollers to wind and unwind the web, a sub-frame supporting said rollers, means removably holding the sub-frame on the frame with the gears on the rollers in operative engagement with the gear train, a lock adapted to prevent rotation of said rollers, means to render said lock operative when the gears on the rollers are out of engagement with said train, and means to render said lock inoperative when said gears are in said engagement.

5. In a vehicle indicator, a pair of rollers having a web sign wound thereon, a gear on one end of each roller, a frame supporting a gear train adapted to engage the gears on the rollers to wind and unwind the web, a sub-frame supporting said rollers, means removably holding the sub-frame on the frame with the gears on the rollers in operative engagement with the gear train, spring fingers on said sub-frame adapted to engage said roller gears, and projections on the frame adapted to engage said fingers and move them out of engagement with said gears when said gears are in operative engagement with said train.

LYTLE GALE HUNTER.